United States Patent
Kang et al.

(10) Patent No.: US 12,008,330 B2
(45) Date of Patent: Jun. 11, 2024

(54) APPARATUS AND METHOD FOR AUGMENTING TEXTUAL DATA

(71) Applicant: SAMSUNG SDS CO., LTD., Seoul (KR)

(72) Inventors: Na Un Kang, Seoul (KR); Geon Yi, Seoul (KR); Min Young Lee, Seoul (KR); Min Soo Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 354 days.

(21) Appl. No.: 17/510,640

(22) Filed: Oct. 26, 2021

(65) Prior Publication Data

US 2022/0129644 A1 Apr. 28, 2022

(30) Foreign Application Priority Data

Oct. 26, 2020 (KR) .................. 10-2020-0139566

(51) Int. Cl.
*G06F 40/40* (2020.01)
*G06F 18/21* (2023.01)
*G06F 40/284* (2020.01)

(52) U.S. Cl.
CPC .......... *G06F 40/40* (2020.01); *G06F 18/2193* (2023.01); *G06F 40/284* (2020.01)

(58) Field of Classification Search
CPC ..... G06F 40/40; G06F 40/284; G06F 18/2193
USPC .......................................................... 704/9
See application file for complete search history.

(56) References Cited

U.S. PATENT DOCUMENTS

| | | | |
|---|---|---|---|
| 2008/0243785 A1* | 10/2008 | Stading | G06F 16/9535 |
| 2019/0354895 A1 | 11/2019 | Vasudevan et al. | |
| 2020/0043600 A1* | 2/2020 | Glottmann | G16H 15/00 |
| 2020/0226212 A1 | 7/2020 | Tan et al. | |

FOREIGN PATENT DOCUMENTS

WO WO 2019/143384 A1 7/2019

OTHER PUBLICATIONS

A Multi-cascaded Model with Data Augmentation for Enhanced Paraphrase Detection in Short Texts Muhammad Haroon Shakeel, Asim Karim, Imdadullah Khan (Year: 2019) (Year: 2019).*

Y. K. Shyang and J. L. S. Yan, "A Text Augmentation Approach using Similarity Measures based on Neural Sentence Embeddings for Emotion Classification on Microblogs," 2020 IEEE 2nd International Conference on Artificial Intelligence in Engineering and Technology (IICAIET), Kota Kinabalu, Malaysia, 2020 (Year: 2020).*

(Continued)

*Primary Examiner* — Bharatkumar S Shah
(74) *Attorney, Agent, or Firm* — Sughrue Mion, PLLC (57) ABSTRACT

An apparatus for augmenting textual data according to an embodiment includes a data augmenter configured to generate augmented data by augmenting input textual data according to a data augmentation scheme decided based on a type of natural language processing task of the input textual data and a data classifier configured to classify the augmented data into a positive sample or a negative sample by determining whether or not the augmented data maintains label information of the input textual data based on one or more data classification criteria.

22 Claims, 5 Drawing Sheets

(56) References Cited

OTHER PUBLICATIONS

Reprocessingpubmed Abstracts S.Vijaya1 Dr. R.Radha2 Research Scholar, Associate Professor, Dept. of Computer Science, Dept. of Computer Science, S.D.N.B. Vaishnav College for Women, S.D.N.B. Vaishnav College for Women, Chromepet, Chennai. Chromepet, Chennai. vijeshnisna@gmail.com (Year: 1993) (Year: 1993).*

Vukosi Marivate et al., "Improving short text classification through global augmentation methods", arXiv preprint arXiv: 1907.03752, Jul. 7, 2019.

Office action dated Oct. 24, 2022 from Korean Patent Office in a counterpart Korean Patent Application No. 2020-0139566 (all the cited references are listed in this IDS.) (English translation is also submitted herewith.).

European Search Report For EP21204712.0 dated Feb. 25, 2022 from European patent office in a counterpart European patent application.

Jean-Philippe Corbeil et al., "BET: A Backtranslation Approach for Easy Data Augmentation in Transformer-based Paraphrase Identification Context", Sep. 26, 2020, ArXiv.Org, XP081772054, Cornell University Library, NY.

\* cited by examiner

APPARATUS AND METHOD FOR AUGMENTING TEXTUAL DATA

CROSS-REFERENCE TO RELATED APPLICATION

This application claims the benefit under 35 USC § 119(a) of Korean Patent Application No. 10-2020-0139566, filed on Oct. 26, 2020, in the Korean Intellectual Property Office, the entire disclosure of which is incorporated herein by reference for all purposes.

BACKGROUND

1. Field

The disclosed embodiments relate to a technique for augmenting textual data augmentation.

2. Description of Related Art

Recently, a method for augmenting data as a method of generating data for training an artificial neural network is being actively studied. In particular, among data augmentation schemes, in the case of data augmentation schemes for voice and image fields, data augmentation schemes of various techniques have been studied and actually applied. In contrast, research on data augmentation in the field of natural language processing is being insignificantly attempted.

In the case of natural language processing, there is a problem in applying the research results in the field of voice and images as it is, because there is a problem that randomly listed strings do not form a sentence or that words with similar pronunciation often have different meanings.

SUMMARY

The disclosed embodiments are intended to provide a method and apparatus for augmenting textual data.

According an aspect of the disclosure, there is provided an apparatus for augmenting textual data comprising a data augmenter configured to generate augmented data by augmenting input textual data according to a data augmentation scheme decided based on a type of natural language processing task of the input textual data and a data classifier configured to classify the augmented data into a positive sample or a negative sample by determining whether or not the augmented data maintains label information of the input textual data based on one or more data classification criteria.

The apparatus for augmenting textual data may further comprise a consistency determinator configured to decide whether or not to use the augmented data based on a result classified according the one or more data classification criteria.

The data augmenter may be further configured to decide an augmentation scale based on at least one of the type of natural language processing task, the data augmentation scheme, whether or not it is a key sentence, and a type of the input textual data.

The data classifier may comprise at least one of a first analyzer configured to decide whether or not the augmented data is the positive sample or the negative sample using a mapping table preset according to the data augmentation scheme and the type of natural language processing task of the input textual data, a second analyzer configured to analyze whether or not the augmented data satisfies grammar to decide whether or not the augmented data is the positive sample or the negative sample, and a third analyzer configured to compare a predicted value of user input label with a label of the augmented data to decide whether or not the augmented data is the positive sample or the negative sample.

The consistency determinator may be further configured to decide whether or not to use the augmented data based on a ratio or number of results decided as positive samples among the results of at least one of the first analyzer, the second analyzer, and the third analyzer.

The consistency determinator may be further configured to decide to use the augmented data when it is determined that the augmented data is the positive sample based on the result classified according to the one or more data classification criteria, and decide not to use the augmented data when it is determined that the augmented data is the negative sample based on the result classified according to the one or more data classification criteria.

The conformity determinator may be further configured to decide whether or not to use the augmented data further based on the type of natural language processing task of the input textual data when it is determined that the augmented data is the negative sample based on the result classified according to the one or more data classification criteria, The apparatus for augmenting textual data may further comprise a preprocessor configured to preprocesses the input textual data using at least one of tokenization, stopword removing, stemming, and lemmatization and transmits the preprocessed input textual data to the data augmenter.

The apparatus for augmenting textual data may further comprise an input data analyzer configured to decide at least one of whether or not the input textual data satisfies a predetermined requirement for data augmentation, a type of a dominant language of the input textual data, whether or not the input textual data corresponds to any one of a single sentence, a single document, and a corpus, and the type of natural language processing task corresponding to the input textual data.

The input analyzer may be further configured to decide that the input textual data satisfies the predetermined requirement for data augmentation when the input textual data includes one or more sentences in which one or more sentence elements are combined.

The input analyzer may be further configured to decide the type of the dominant language of the input textual data based on Unicode for each language.

The input analyzer may be further configured to decide the type of natural language processing task based on the label of the input textual data.

According another aspect of the disclosure, there is provided a method for augmenting textual data comprising generating augmented data by augmenting input textual data according to a data augmentation scheme decided based on a type of natural language processing task of the input textual data and classifying the augmented data into a positive sample or a negative sample by determining whether or not the augmented data maintains label information of the input textual data based on one or more data classification criteria.

The method for augmenting textual data may further comprise deciding whether or not to use the augmented data based on a result classified according to the one or more data classification criteria.

The generating of the augmented data may comprise deciding an augmentation scale based on at least one of the type of natural language processing task, the data augmentation scheme, whether or not it is a key sentence, and a type of the input textual data.

The classifying of the augmented data may comprise classifying the augmented data using at least one of a first analysis method for deciding whether or not the augmented data is the positive sample or the negative sample using a mapping table preset according to the data augmentation scheme and the type of natural language processing task of the input textual data, a second analysis method for analyzing whether or not the augmented data satisfies grammar to decide whether or not the augmented data is the positive sample or the negative sample, and a third analysis method for comparing a predicted value of user input label with a label of the augmented data to decide whether or not the augmented data is the positive sample or the negative sample.

The deciding whether or not to use the augmented data may comprise deciding whether or not to use the augmented data based on a ratio or number of results decided as positive samples among the results of at least one of the first analysis method, the second analysis method, and the third analysis method.

The deciding whether or not to use the augmented data may comprise deciding to use the augmented data when it is determined that the augmented data is the positive sample based on the result classified according to the one or more data classification criteria, and deciding not to use the augmented data when it is determined that the augmented data is the negative sample based on the result classified according to the one or more data classification criteria.

The deciding whether or not to use the augmented data may comprise deciding whether or not to use the augmented data further based on the type of natural language processing task of the input textual data when it is determined that the augmented data is the negative sample based on the result classified according to the one or more data classification criteria.

The method for augmenting textual data may further comprise preprocessing the input textual data using at least one of tokenization, stopword removing, stemming, and lemmatization.

The method for augmenting textual data may further comprise deciding at least one of whether or not the input textual data satisfies a predetermined requirement for data augmentation, a type of a dominant language of the input textual data, whether or not the input textual data corresponds to any one of a single sentence, a single document, and a corpus, and the type of natural language processing task corresponding to the input textual data.

The deciding may comprise deciding that the input textual data satisfies the predetermined requirement for data augmentation when the input textual data includes one or more sentences in which one or more sentence elements are combined.

The deciding may comprise deciding the type of the dominant language of the input textual data based on Unicode for each language.

The deciding may comprise deciding the type of natural language processing task based on the label of the input textual data.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies related to the present disclosure may unnecessarily obscure the subject matter of the disclosed embodiments, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
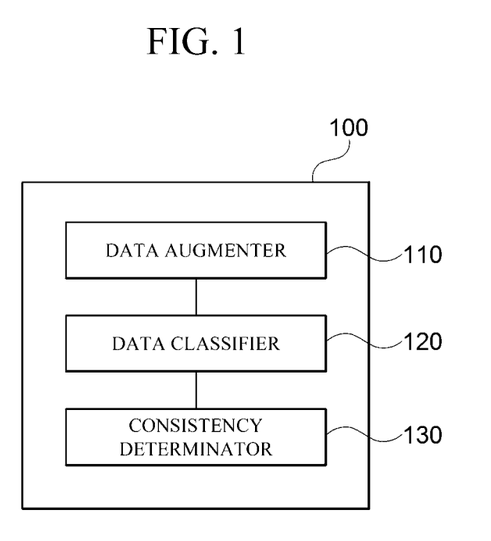
FIG. 1 is a configuration diagram of an apparatus for augmenting textual data according to an embodiment.

FIG. 1 is a configuration diagram of an apparatus for augmenting textual data according to an embodiment.

Referring to FIG. 1, an apparatus for augmenting textual data 100 may include a data augmenter 110 that augments input data, a data classifier 120 that classifies the augmented data into a positive sample or a negative sample, and a consistency determinator 130 that decides whether or not to use the augmented data.

According to an embodiment, the data augmenter 110 may generate augmented data by augmenting input textual data according to a data augmentation scheme decided based on a type of natural language processing task of the input textual data.

According to an example, the natural language processing task may be a task for performing one of various types of natural language processing having different analysis purposes, such as dialogue act analysis, text classification, sentiment analysis, intent detection, part-of-speech tagging, named entity recognition, information extraction, relation extraction, text summarization, topic extraction, etc. However, the type of natural language processing performed by the natural language processing task is not necessarily limited to the example described above, and in addition to the example described above, various types of natural language processing tasks for natural language processing may be included in the project.

According to an example, the data augmentation scheme may be at least one of a paraphrasing scheme for augmenting data by performing machine translation twice or more, a sentence negation scheme for augmenting textual data by replacing textual data with a negative form of a verb obtained as a result of morpheme analysis using a POS (Part-Of-Speech) tagger, a pronoun swap scheme for replacing a pronoun obtained as a result of morphological analysis using the POS tagger with another pronoun, or performing the pronoun replacement by utilizing anaphora resolution, an entity swap scheme for replacing an entity obtained by performing entity recognition with another entity of the same type, a number swap scheme for converting an entity obtained by performing entity recognition is obtained by replacing it with another entity of the same type, or an element of a numeric type obtained as a result of morphological analysis into another value, a noise injection scheme for adding the same value for each element obtained as a result of morphological analysis n times or adding values of stop words, a synonym replacement scheme for performing replacement of a thesaurus dictionary for each element of the same tag obtained as a result of morpheme analysis, substitution of a synonym dictionary for each entity obtained by performing word embeddings based substitution, or entity recognition, word embeddings based substitution, a random insertion scheme for adding random values between elements and elements obtained as a result of morphological analysis, a random swap scheme for changing the order of elements and elements obtained as a result of morphological analysis, a random deletion scheme for removing some of the elements obtained as a result of morphological analysis, a spacing scheme for arbitrarily removing or adding spaces between elements of pre-trained model or language model output result or result of morphological analysis are, and a summarization scheme for performing summarization.

According to an example, the data augmentation scheme for augmenting input textual data may be decided according to the type of natural language processing task. As an example, when the natural language processing task is text summarization, the data augmentation scheme may be decided as the summarization scheme.

According to an example, two or more data augmentation schemes may be used to augment input textual data. As an example, the paraphrasing scheme and the noise injection scheme may be individually applied to one input textual data or may be applied thereto together in a predetermined order.

According to an example, one input textual data may correspond to two or more natural language processing tasks. As an example, the sentiment analysis task and the intent detection task may be applied to one input textual data. In this case, the data augmentation scheme may be individually decided according to each of the sentiment analysis and intent detection, and each data augmentation scheme may be individually applied to one input textual data, or may be applied thereto together in a predetermined order.

According to an embodiment, the data augmenter 110 may decide the augmentation scale based on at least one of the type of natural language processing task, the data augmentation scheme, a key sentence, and a type of input textual data.

According to an example, the data augmenter 110 may decide the data augmentation scale based on the type of natural language processing task. As an example, the data augmenter 110 may determine the data augmentation scale such as 4 times the input textual data in the case of dialogue act analysis, 100 times in the case of text classification, and 10 times in the case of sentiment analysis.

According to an example, the data augmenter 110 may decide the data augmentation scale based on the data augmentation scheme. As an example, the data augmenter 110 may determine the data augmentation scale, such as 10 times in the case of the paraphrasing scheme, 100 times in the case of the sentence negation scheme, and 5 times in the case of the pronoun swap scheme.

According to an example, the data augmenter 110 may decide the data augmentation scale based on whether or not it is a key sentence. As an example, the data augmenter 110 may determine the data augmentation scale, such as 100 times in the case where a predetermined sentence is a key sentence, 10 times in the case of a general sentence, and the like.

According to an example, the data augmenter 110 may determine the data augmentation scale based on the type of input textual data. As an example, the data augmenter 110 may determine the data augmentation scale, such as 10 times in the case of a single sentence, 100 times in the case of a single document, and 1000 times in the case of a corpus.

According to an example, the data augmenter 110 may decide the data augmentation scale by a minimum of 4 times to a maximum of 10 square times of the input textual data.

According to an embodiment, the data classifier 120 may determine whether or not the augmented data maintains label information of the input textual data based on one or more data classification criteria, and classify the augmented data as a positive sample or a negative sample.

According to an example, the data classifier 120 may classify textual data as a positive sample when label information of the input textual data is maintained, and the data is augmented, and classify the input textual data as a negative sample when the input textual data is damaged, such as including noise data having the opposite meaning of the input textual data or the sentence itself is not established.

According to an embodiment, the consistency determinator 130 may decide whether or not to use the augmented data according to a result classified based on one or more data classification criteria.

According to an example, the data classifier 120 may output one classification result using one classification scheme or may output two or more classification results using two or more classification schemes.

For example, when the data classifier 120 outputs a classification result using one classification scheme, the consistency determinator 130 may decide whether or not to use the corresponding augmented data based on whether one classification result is the positive sample or the negative sample.

As an example, when the classification result is the positive, the data determinator 130 may decide to use the corresponding augmented data.

As another example, when the classification result is the negative sample, the data determinator 130 may decide not to use the corresponding augmented data.

According to an example, when the augmented data is classified as the negative sample, the data determinator 130 may decide whether or not to use the corresponding augmented data according to the type of natural language processing task according to the corresponding input textual data.

As an example, when the natural language processing task of the input textual data is multi-task learning in which noise data has a positive effect on learning and the classification result of the augmented data is the negative sample, the data determinator 130 may decide to use the corresponding augmented data even though the corresponding augmented data is classified as the negative sample.

According to an example, the data classifier 120 may output two or more classification results using two or more classification schemes.

For example, when the data classifier 120 outputs a classification result using two or more classification schemes, the consistency determinator 130 may decide whether or not to use the corresponding augmented data based on the number of positive and negative samples or the ratio of positive and negative samples among the two or more classification results.

Figure 2:
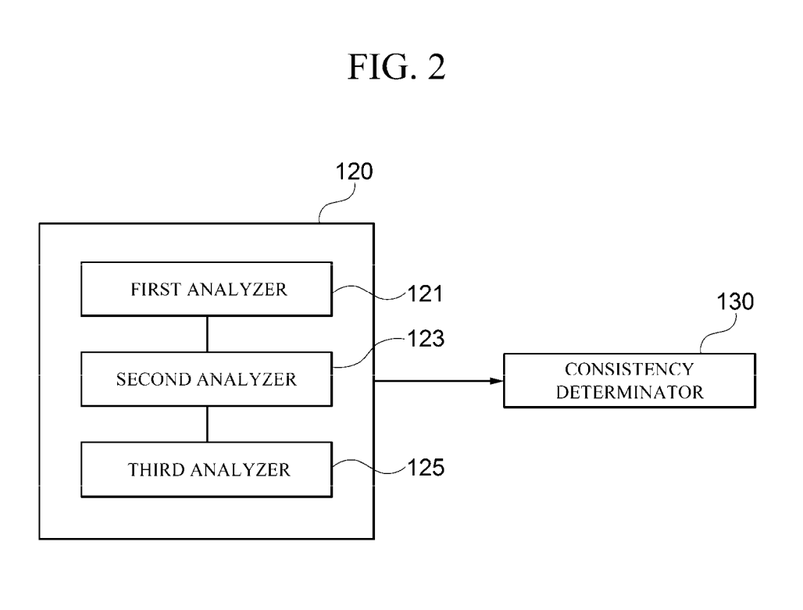
FIG. 2 is a configuration diagram of a data classifier according to an embodiment.

FIG. 2 is a configuration diagram of the data classifier according to an embodiment.

Referring to FIG. 2, a data classifier 120 may include one or more analyzers 121, 123, and 125.

According to an embodiment, the data classifier 120 may classify the augmented data into the positive sample or the negative sample by determining whether or not the augmented data maintains label information of the input textual data based on one or more data classification criteria.

According to an example, the data classifier 120 may include the first analyzer 121 that decides whether or not the augmented data is the positive sample or the negative sample using a mapping table preset according to the data augmentation scheme and the type of natural language processing task of the input textual data.

As an example, whether or not the augmented data according to the data augmentation scheme is the positive sample or the negative sample may be predicted according to the nature of the natural language processing task. For example, in the case of the sentiment analysis task, it is highly likely that a negative sample is generated when data is augmented using the sentence negation scheme. Accordingly, the first analyzer may have a mapping table mapped to the negative sample when the sentiment analysis task and the sentence negation scheme are used.

According to an example, the data classifier 120 may include the second analyzer 123 that decides whether or not the augmented data is the positive sample or the negative sample by analyzing whether or not the augmented data satisfies grammar.

For example, when a verb appears twice or more in a short sentence as a result of morphological analysis of the augmented data, the second analyzer 123 may determine that the augmented data is a non-sentence and classify the augmented data as the negative sample.

According to an example, the data classifier 120 may include the third analyzer 125 that decides whether or not the sample is the positive sample or the negative sample by comparing a predicted value of user input label with the label of the augmented data.

For example, the user may predict a label for the augmented data, and the third analyzer 125 may decide the augmented data as the positive sample if the two labels match when comparing a label predicted by the user with an actual label of the augmented data, and decide the augmented data as the negative sample if the two labels do not match.

As an example, the third analyzer 125 may operate in the case of a condition in which there are two or more types of labels and each label includes 10 or more sentence data.

According to an embodiment, the consistency determinator may decide whether or not to use the augmented data based on a ratio or number of results decided as positive samples among the results of at least one of the first analyzer, the second analyzer, and the third analyzer.

According to this example, the consistency determinator 130 may determine whether or not the augmented data is the positive sample or the negative sample by using the results of at least one of the first analyzer, the second analyzer, and the third analyzer.

For example, when the data classifier 120 includes all of the first analyzer, the second analyzer and the third analyzer and outputs three classification results, the consistency determinator 130 may determine that the corresponding augmented data is the positive sample when two or more of the three classification results are positive samples.

When it is determined that the augmented data is the positive sample based on the results classified according to the one or more data classification criteria, the consistency determinator may decide to use the augmented data. For example, when two or more of the three classification results are positive samples, the consistency determinator 130 may determine that the corresponding augmented data is the positive sample, and decide to use the corresponding augmented data according to the determination result.

When it is determined that the augmented data is the negative sample based on the results classified according to the one or more data classification criteria, the consistency determinator 130 may determine not to use the augmented data. For example, when one of the three classification results is the positive sample, the consistency determinator 130 may determine that the corresponding augmented data is the negative sample, and decide not to use the corresponding augmented data according to the determination result.

According to an embodiment, when it is determined that the augmented data is the negative sample based on the results classified according to the one or more data classification criteria, the conformity determinator may decide whether or not to use the augmented data further based on the type of natural language processing task of the input textual data.

For example, when one of the three classification results is the positive sample, the consistency determinator 130 may determine that the corresponding augmented data is the negative sample. In this case, when the natural language processing task of the input textual data is multi-task learning in which noise data has a positive effect on learning, the data determinator 130 may decide to use the corresponding augmented data even though the corresponding augmented data is classified as the negative sample.

Figure 3:
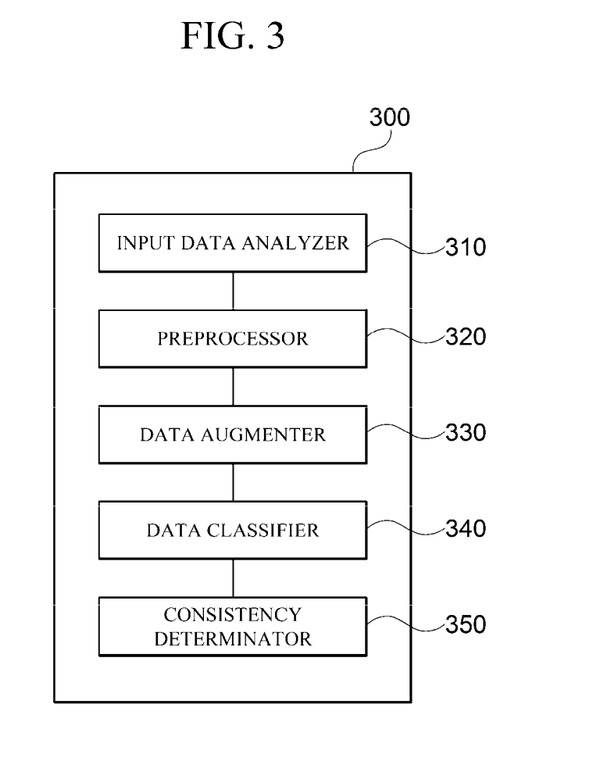
FIG. 3 is a configuration diagram of an apparatus for augmenting textual data according to an embodiment.

FIG. 3 is a configuration diagram of an apparatus for augmenting textual data according to an embodiment.

Referring to FIG. 3, an apparatus for augmenting textual data 300 may include an input data analyzer 310, a preprocessor 320, a data augmenter 330, a data classifier 340, and a consistency determinator 350.

According to one embodiment, the input data analyzer 310 may decide at least one of whether or not the input textual data satisfies a predetermined requirement for data augmentation, a type of a dominant language of the input textual data, whether or not the input textual data corresponds to any one of a single sentence, a single document, and a corpus, and the type of natural language processing task corresponding to the input textual data.

According to an example, the input data analyzer 310 may decide whether or not the input textual data satisfies a predetermined requirement for data augmentation. As an example, the predetermined requirement may be whether or not the input textual data includes one or more sentences in which one or more sentence elements are combined.

According to an example, when the input data analyzer 310 determines that the input textual data does not include one or more sentences, the input data analyzer 310 may output a message to the user to re-enter the input textual data.

According to an embodiment, the input data analyzer 310 may decide a type of the dominant language of the input textual data.

According to an example, the type of the dominant language of the input textual data may be decided based on Unicode for each language. For example, the Unicode range for each language may be different, and the input data analyzer 310 may decide the dominant language of the input textual data based on the Unicode range. For example, the Unicode range of Hangul may be 1100 to 11FF.

According to an example, the input data analyzer 310 may decide whether or not the input textual data corresponds to any one of a single sentence, a single document, and a corpus.

According to an example, the input data analyzer 310 may decide the type of natural language processing task corresponding to the input textual data. As an example, the type of natural language processing task may be decided based on a label of the input textual data.

According to an embodiment, the preprocessor 320 may preprocess the input textual data using at least one of tokenization, stopword removing, stemming, and lemmatization and transmits the input textual data to the data augmenter. As an example, the preprocessor 320 may decide a language resource to be used for preprocessing based on the dominant language decided by the input data analyzer 310.

For example, the language resource may be at least one of word embedding, pre-trained models, dictionaries, anaphora resolution, POS tagger, entity recognition, summarization, and machine translation.

According to an embodiment, the data augmenter 330, the data classifier 340, and the consistency determinator 350 may operate as in the embodiment for the data augmenter 110, the data classifier 120 and the consistency determinator 130 described with reference to FIGS. 1 and 2.

Figure 4:
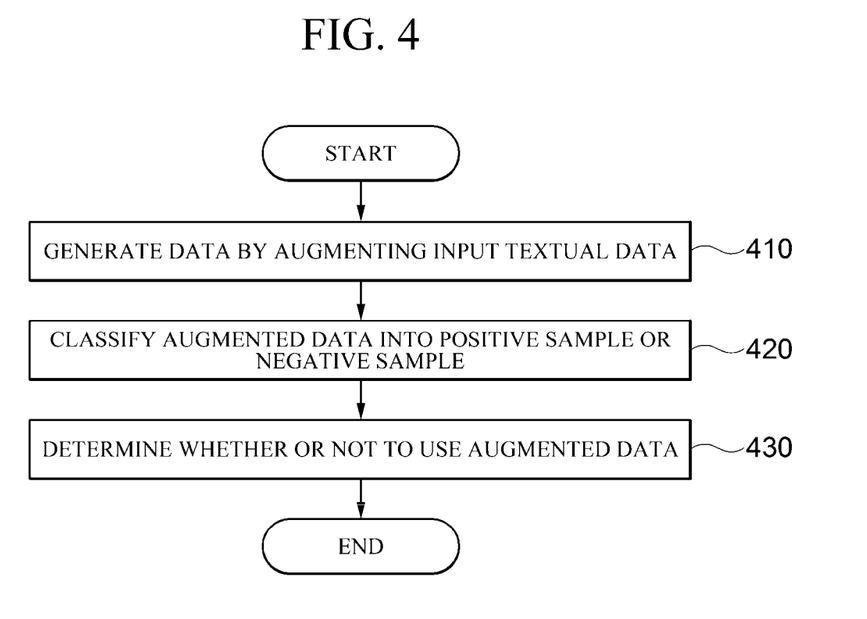
FIG. 4 is a flowchart of a method for augmenting textual data according to an embodiment.

FIG. 4 is a flowchart of the method for augmenting textual data according to an embodiment.

Referring to FIG. 4, the apparatus for augmenting textual data may generate augmented data by augmenting input textual data according to a data augmentation scheme decided based on a type of natural language processing task of the input textual data (410).

According to an embodiment, the apparatus for augmenting textual data may decide the augmentation scale based on at least one of the type of natural language processing task, the data augmentation scheme, the key sentence, and the type of input textual data.

According to an example, the apparatus for augmenting textual data may decide the data augmentation scale by a minimum of 4 times to a maximum of 10 square times of the input textual data.

According to an embodiment, the apparatus for augmenting textual data may classify the augmented data into the positive sample or the negative sample by determining whether or not the augmented data maintains label information of the input textual data based on one or more data classification criteria (420).

According to one embodiment, the apparatus for augmenting textual data may classify the augmented data using at least one of a first analysis method for deciding whether or not the augmented data is the positive sample or the negative sample using a mapping table preset according to the data augmentation scheme and the type of natural language processing task of the input textual data, a second analysis method for determining whether the augmented data is the positive sample or the negative sample by analyzing whether or not the augmented data satisfies grammar, and a third method for deciding whether the augmented data is the positive sample or the negative sample by comparing a predicted value of user input label with a label of the augmented data.

According to an example, the apparatus for augmenting textual data may decide whether or not the augmented data is the positive sample or the negative sample by using a mapping table preset according to the data augmentation scheme and the type of natural language processing task of the input textual data.

As an example, whether or not the augmented data according to the data augmentation scheme is the positive sample or the negative sample may be predicted according to the nature of the natural language processing task. For example, in the case of the sentiment analysis task, it is highly likely that the negative sample is generated when data is augmented using the sentence negation scheme. Accordingly, the apparatus for augmenting textual data may have a mapping table mapped to the negative sample when the sentiment analysis task and the sentence negation scheme are used.

According to an example, the apparatus for augmenting textual data may decide) whether or not the augmented data is the positive sample or the negative sample by analyzing whether or not the augmented data satisfies the grammar.

For example, when a verb appears twice or more in a short sentence as a result of morphological analysis of the augmented data, the apparatus for augmenting textual data may determine that the augmented data is a non-sentence and classify the augmented data as the negative sample.

According to an example, the apparatus for augmenting textual data may decide whether or not the sample is the positive sample or the negative sample by comparing the predicted value of user input label with the label of the augmented data.

For example, the user may predict a label for the augmented data, and the apparatus for augmenting textual data may decide the augmented data as the positive sample if the two labels match when comparing a label predicted by a user with an actual label of the augmented data, and decide the augmented data as the negative sample if the two labels do not match.

According to an embodiment, the apparatus for augmenting textual data may decide whether or not to use the augmented data based on the results classified according to the one or more data classification criteria.

According to one embodiment, the apparatus for augmenting textual data may decide whether or not to use the augmented data based on a ratio or number of results decided as positive samples among the results of at least one of the first analyzer, the second analyzer, and the third analyzer.

For example, when two or more of three classification results according to the first analysis method, the second analysis method, and the third analysis method are positive samples, the apparatus for augmenting textual data may determine that the corresponding enhancement data is the positive sample.

According to an embodiment, the apparatus for augmenting textual data may decide to use the augmented data when it is determined that the augmented data is the positive sample based on the result classified according to the one or more data classification criteria, and may decide not to use the augmented data when it is determined that the augmented data is the negative sample based on a result classified according to the one or more data classification criteria.

For example, when two or more of the three classification results are positive samples, the apparatus for augmenting textual data may determine that the corresponding augmented data is the positive sample, and decide to use the corresponding augmented data according to the determination result.

For example, when one of the three classification results is the positive sample, the apparatus for augmenting textual data may determine that the corresponding augmented data is the negative sample, and decide not to use the corresponding augmented data according to the determination result.

According to one embodiment, when it is determined that the augmented data is the negative sample based on the results classified according to the one or more data classification criteria, the apparatus for augmenting textual data may decide whether or not to use the augmented data further based on the type of natural language processing task of the input textual data.

For example, when one of the three classification results is the positive sample, the apparatus for augmenting textual data may determine that the corresponding augmented data is the negative sample. In this case, when the natural language processing task of the input textual data is multi-task learning in which noise data has a positive effect on learning, the apparatus for augmenting textual data may decide to use the corresponding augmented data even though the corresponding augmented data is classified as the negative sample.

According to an embodiment, the apparatus for augmenting textual data may preprocess the input textual data using at least one of tokenization, stopword removing, stemming, and lemmatization.

As an example, the language resource may be at least one of word embedding, pre-trained models, dictionaries, anaphora resolution, POS tagger, entity recognition, summarization, and machine translation.

According to one embodiment, the apparatus for augmenting textual data may decide at least one of whether or not the input textual data satisfies a predetermined requirement for data augmentation, the type of a dominant language of the input textual data, whether or not the input textual data corresponds to any one of a single sentence, a single document, and a corpus, and the type of natural language processing task corresponding to the input textual data.

According to an example, the apparatus for augmenting textual data may decide whether or not the input textual data satisfies a predetermined requirement for data augmentation. As an example, the predetermined requirement may be whether or not the input textual data includes one or more sentences in which one or more sentence elements are combined.

According to an example, when the apparatus for augmenting textual data determines that the input textual data does not include one or more sentences, the apparatus for augmenting textual data may output a message to the user to re-enter the input textual data.

According to an embodiment, the apparatus for augmenting textual data may decide a type of the dominant language of the input textual data.

According to an example, the type of the dominant language of the input textual data may be decided based on Unicode for each language. For example, the Unicode range for each language may be different, and the apparatus for augmenting textual data may decide the dominant language of the input textual data based on the Unicode range. For example, the Unicode range of Hangul may be 1100 to 11FF.

According to an example, the apparatus for augmenting textual data may decide whether or not the input textual data corresponds to any one of a single sentence, a single document, and a corpus.

According to an example, the apparatus for augmenting textual data may decide the type of natural language processing task corresponding to the input textual data. As an example, the type of natural language processing task may be decided based on a label of the input textual data.

Figure 5:
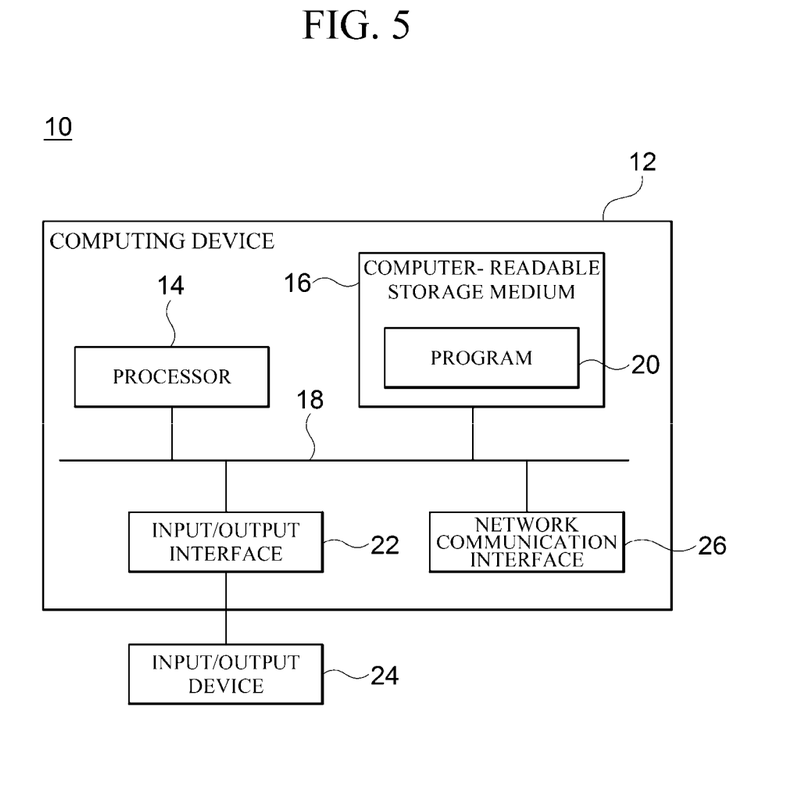
FIG. 5 is a block diagram illustratively describing a computing environment including a computing device according to an embodiment.

FIG. 5 is a block diagram for illustratively describing a computing environment that includes a computing device according to an embodiment.

In the illustrated embodiment, each component may have different functions and capabilities in addition to those described below, and additional components may be included in addition to those described below.

The illustrated computing environment 10 includes a computing device 12. In one embodiment, the computing device 12 may be one or more components included in the apparatus for augmenting textual data 120. The computing device 12 includes at least one processor 14, a computer-readable storage medium 16 and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing device 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to the disclosed embodiments, the same data augmentation scheme can be applied regardless of the type of language through preprocessing, and thus augmented textual data can be generated using textual data for various languages.

Although the present disclosure has been described in detail through representative examples above, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents of the claims.

What is claimed is:

1. An apparatus for augmenting textual data, the apparatus comprising:
    a data augmenter configured to generate augmented data by augmenting input textual data according to a data augmentation scheme decided based on a type of natural language processing task of the input textual data; and
    a data classifier configured to classify the augmented data into a positive sample or a negative sample by determining whether or not the augmented data maintains label information of the input textual data based on one or more data classification criteria,
    wherein the data classifier comprises at least one of:
    a first analyzer configured to decide whether or not the augmented data is the positive sample or the negative sample using a mapping table preset according to the data augmentation scheme and the type of natural language processing task of the input textual data;
    a second analyzer configured to analyze whether or not the augmented data satisfies grammar to decide whether or not the augmented data is the positive sample or the negative sample; or
    a third analyzer configured to compare a predicted value of user input label with a label of the augmented data to decide whether or not the augmented data is the positive sample or the negative sample.

2. The apparatus of claim 1, further comprising:
    a consistency determinator configured to decide whether or not to use the augmented data based on a result classified according the one or more data classification criteria.

3. The apparatus of claim 2, wherein the consistency determinator is further configured to decide whether or not to use the augmented data based on a ratio or number of results decided as positive samples among the results of at least one of the first analyzer, the second analyzer, or the third analyzer.

4. The apparatus of claim 2, wherein the consistency determinator is further configured to:
    decide to use the augmented data when it is determined that the augmented data is the positive sample based on results classified according to the one or more data classification criteria; and
    decide not to use the augmented data when it is determined that the augmented data is the negative sample based on the result classified according to the one or more data classification criteria.

5. The apparatus of claim 4, wherein the consistency determinator is further configured to decide whether or not to use the augmented data further based on the type of natural language processing task of the input textual data when it is determined that the augmented data is the negative sample based on the result classified according to the one or more data classification criteria.

6. The apparatus of claim 1, wherein the data augmenter is further configured to decide an augmentation scale based on at least one of the type of natural language processing task, the data augmentation scheme, whether or not it is a key sentence, or a type of the input textual data.

7. The apparatus of claim 1, further comprising:
    a preprocessor configured to preprocess the input textual data using at least one of tokenization, stopword removing, stemming, or lemmatization and transmit the preprocessed input textual data to the data augmenter.

8. The apparatus of claim 1, further comprising:
    an input data analyzer configured to decide at least one of whether or not the input textual data satisfies a predetermined requirement for data augmentation; a type of a dominant language of the input textual data; whether or not the input textual data corresponds to any one of a single sentence, a single document, and a corpus; or the type of natural language processing task corresponding to the input textual data.

9. The apparatus of claim 8, wherein the input data analyzer is further configured to decide that the input textual data satisfies the predetermined requirement for data augmentation when the input textual data includes one or more sentences in which one or more sentence elements are combined.

10. The apparatus of claim 8, wherein the input data analyzer is further configured to decide the type of the dominant language of the input textual data based on Unicode for each language.

11. The apparatus of claim 8, wherein the input data analyzer is further configured to decide the type of natural language processing task based on the label of the input textual data.

12. A method for augmenting textual data comprising:
    generating augmented data by augmenting input textual data according to a data augmentation scheme decided based on a type of natural language processing task of the input textual data; and
    classifying the augmented data into a positive sample or a negative sample by determining whether or not the augmented data maintains label information of the input textual data based on one or more data classification criteria,
    wherein the classifying of the augmented data comprises classifying the augmented data using at least one of:
    a first analysis method for deciding whether or not the augmented data is the positive sample or the negative sample using a mapping table preset according to the data augmentation scheme and the type of natural language processing task of the input textual data;
    a second analysis method for analyzing whether or not the augmented data satisfies grammar to decide whether or not the augmented data is the positive sample or the negative sample; or
    a third analysis method for comparing a predicted value of user input label with a label of the augmented data to decide whether or not the augmented data is the positive sample or the negative sample.

13. The method of claim 12, further comprising:
    deciding whether or not to use the augmented data based on a result classified according to the one or more data classification criteria.

14. The method of claim 13, wherein the deciding whether or not to use the augmented data comprises deciding whether or not to use the augmented data based on a ratio or number of results decided as positive samples among the results of at least one of the first analysis method, the second analysis method, or the third analysis method.

15. The method of claim 13, wherein the deciding whether or not to use the augmented data comprises:
deciding to use the augmented data when it is determined that the augmented data is the positive sample based on the result classified according to the one or more data classification criteria; and
deciding not to use the augmented data when it is determined that the augmented data is the negative sample based on the result classified according to the one or more data classification criteria.

16. The method of claim 15, wherein the deciding whether or not to use the augmented data comprises deciding whether or not to use the augmented data further based on the type of natural language processing task of the input textual data when it is determined that the augmented data is the negative sample based on the result classified according to the one or more data classification criteria.

17. The method of claim 12, wherein the generating of the augmented data comprises deciding an augmentation scale based on at least one of the type of natural language processing task, the data augmentation scheme, whether or not it is a key sentence, or a type of the input textual data.

18. The method of claim 12, further comprising:
preprocessing the input textual data using at least one of tokenization, stopword removing, stemming, or lemmatization.

19. The method of claim 12, further comprising:
deciding at least one of whether or not the input textual data satisfies a predetermined requirement for data augmentation; a type of a dominant language of the input textual data; whether or not the input textual data corresponds to any one of a single sentence, a single document, and a corpus; or the type of natural language processing task corresponding to the input textual data.

20. The method of claim 19, wherein the deciding comprises deciding that the input textual data satisfies the predetermined requirement for data augmentation when the input textual data includes one or more sentences in which one or more sentence elements are combined.

21. The method of claim 19, wherein the deciding comprises deciding the type of the dominant language of the input textual data based on Unicode for each language.

22. The method of claim 19, wherein the deciding comprises deciding the type of natural language processing task based on the label of the input textual data.

* * * * *